Oct. 15, 1940.                H. SCHELLER ET AL                2,218,122
                                STRUCTURAL MEMBER
                              Filed March 16, 1938
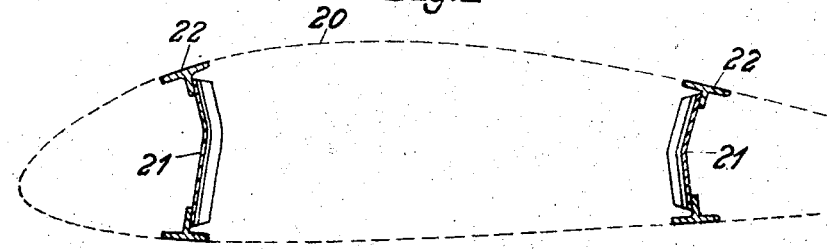
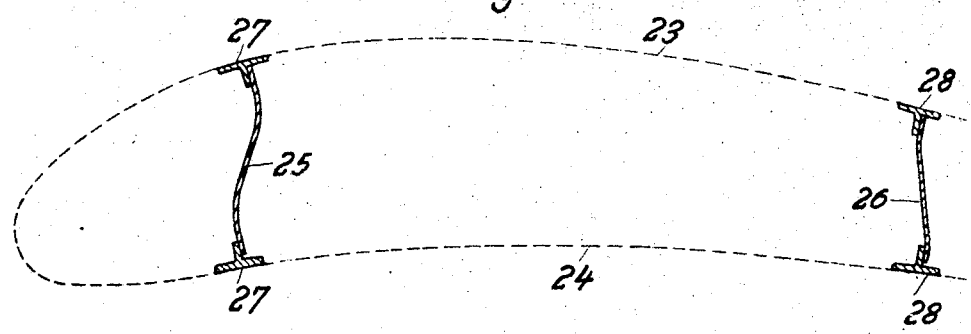
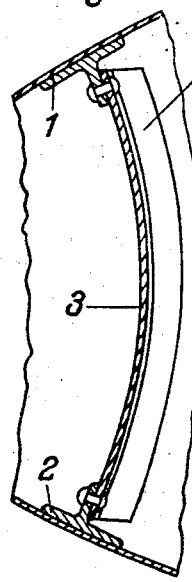 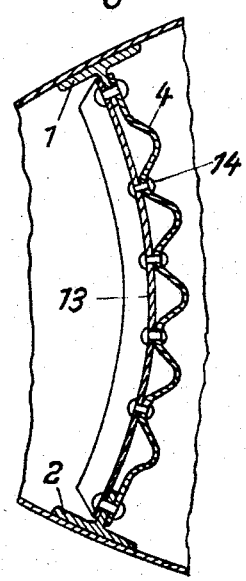 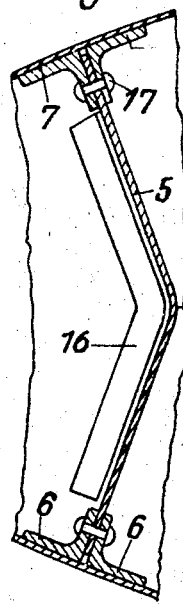 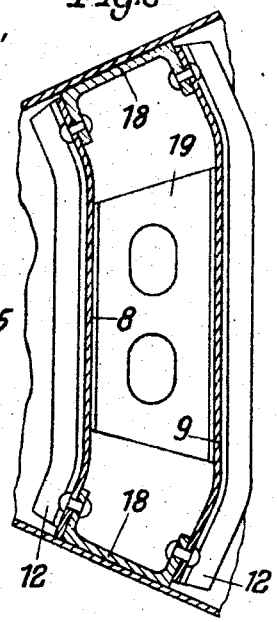

Patented Oct. 15, 1940

2,218,122

UNITED STATES PATENT OFFICE 2,218,122

STRUCTURAL MEMBER

Herbert Scheller, Karl Wagner, and Karl Aikele, Dessau, Germany, assignors to Junkers Flugzeug - und - Motorenwerke Aktiengesellschaft, Dessau, Germany Application March 16, 1938, Serial No. 196,238
In Germany March 24, 1937

6 Claims. (Cl. 244—123)

Our invention relates to structural metal members more especially adapted for use in the construction of the wings and empennage of flying machines and other aircraft.

It is an object of our invention to provide structural members of a novel kind which are particularly adapted for bracing diverging or converging walls of hollow metal bodies.

Composite girders have been used in the construction of aeroplane wings and the like, in which the flange members of the girder were fitted with flange scarfs fixed to the longitudinal edges of plane web plates resistive to shearing stresses. If these flange scarfs shall be so arranged that their outer surfaces extend in parallel to the skin or wall covering of the wing, empennage or the like, flange scarfs of a special section differing from the standard sections must be used. However such special sections involve the drawback of commanding higher prices and rendering difficult the replacing of the parts in the case of repairs. On the other hand, if flange scarfs of standard section are used, the outer surfaces of the flange members of the girder, viewed in cross section, extend in parallel to each other and cannot apply themselves onto the surface of the wing or the like, if this surface is not limited by parallel planes at the points through which the girders extend, while at the same time the overall height of the girder is reduced to an undesirable extent.

In order to avoid these drawbacks, we use, in the construction of the girders forming part of hollow metal bodies such as airplane wing or other structures, standard sections, in combination with web plates of which, if viewed in cross section are so curved or buckled in one or two places, that the outer surfaces of the flanges of the scarfs extend in parallel to the surface of the wing or the like in those points, where the girder contacts the skin or envelope.

We are thereby enabled to form the girder with the greatest overall height obtainable at the point, at which it is arranged.

The web plates may be plain or profilated, being for instance corrugated. Their rigidity and resistivity against shearing stresses may be increased in a well known manner by means of ribs arranged in spaced relation. The flange scarfs may for instance be constituted by rods of T, L or U section and the webs may be formed with one or several walls. When using web scarfs with walls of which extend at right angles to each other, that wall which serves to connect the scarf to the web plate, extends about normally to the wing surface and consequently the web plate must be so shaped that its marginal portion designed to be connected to the web scarf extends normally to the surface of the wing or the like at the point where the girder is attached to this surface.

We will now proceed to explain more in detail the nature of our invention and the manner in which it can be reduced to practice, having reference to the drawing affixed to this specification and forming part thereof, which illustrates our invention diagrammatically by way of example.

In the drawing

Fig. 1 is a diagrammatic showing of the cross section of an aeroplane wing with two girders extending lengthwise through it, these girders comprising combinations of web plates and flange scarfs characteristic of our invention.

Fig. 2 is a similar view of a second modification.

Figs. 3–6 are cross sectional views, drawn to a larger scale, of four different modifications of structural members according to this invention forming part of the construction of aeroplane wings or the like.

Fig. 3 showing a curved web.

Fig. 4 the combination of a similar curved web with a corrugated reinforcing web.

Fig. 5 illustrates a buckled web and

Fig. 6 a double web.

Referring to the drawing and first to Fig. 1, the dash line 20 indicates the contour, skin or wall covering of an aeroplane wing. 21, 21 are buckled webs of two girders extending lengthwise of the wing and 22, 22 are the flanges fixed to the webs and to the skin or covering of the wing structure. The webs 21 are buckled in such manner that the upper halves extend substantially normally to the wing covering, which at the points, where the flanges are fixed to this covering, extends at a considerable angle to the horizontal. Similarly the lower halves of the webs 21 extend substantially normally to the wing bottom, which also extends at a small angle to the horizontal. Consequently the flanges connected by the webs and attached to their ends are held in a position where they extend in parallel to the wing covering.

While in the wing structure shown in Fig. 1 the wing covering is formed in two concave parts, the structure shown in Fig. 2 comprises a concave top 23 and convex bottom 24. Consequently the webs 25 and 26 connecting the flanges 27, 27, 28, 28, respectively, must be curved or buckled twice in opposite directions in order to present the flanges to the covering in parallel relation.

In the girder shown in Fig. 3 the web plate 3 is curved according to a continuous curve and the flanges 1 and 2 fixed to its ends are thus presented to the wing covering in the correct angular positions. 12 are reinforcing angles fixed to the web 3 and extending in spaced relation or in zigzag, being curved in parallel to the web 3.

In Fig. 4 the web 4 is curved and corrugated and reinforced by similarly curved angles 13 connected with the web by rivets 14.

Fig. 5 shows a girder, in which the web plate 5 is buckled at 15 and reinforced by means of buckled angles 16, while the flanges are constituted by angle irons 7, 7' connected with opposite ends of the web by means of rivets 17.

In the girder shown in Fig. 6 flanges of U-section are connected by means of two parallelly extending webs 8 and 9 buckled in two points and spaced by means of apertured plates 19 of U-section.

Obviously the webs may be apertured or composed of several parts or may be replaced by obliquely extending panel rods curved or buckled according to requirements.

The standard sections mentioned above are intended to comprise all sections which have not been specially produced for the individual purpose in view, but can be used for widely differing purposes. This term is intended to include not only rolled sections, but also sections obtained by bending or drawing sheet metal strips.

In wings or the like, the thickness and cross section of which differs in the longitudinal direction, the form of the webs must be adapted to these differences.

We wish it to be understood that we do not desire to be limited to the exact details of construction shown and described for obvious modifications will occur to a person skilled in the art.

We claim:

1. In combination with an airplane control element such as a wing, elevator, rudder or the like having oppositely disposed non-parallel skin surfaces, a reinforcing girder between said surfaces extending transversely thereof, said girder comprising a central web section, a pair of oppositely disposed right-angled flanges having the face of one angle piece extending along and secured to oppositely disposed margins, respectively, of the web, said web being deformed from a single plane to bring the outer face of the other angle piece of each respective flange into parallelism and substantially flush with the skin surface adjacent thereto, and means for securing said last-mentioned angle piece to its adjacent skin surface, thereby positioning between said surfaces by means of standard angled flanges a reinforcing web substantially equal in linear height to the distance between the surfaces at the points of girder attachment.

2. The combination of claim 1, in which the web of the girder is curved.

3. The combination of claim 1, in which the web of the girder is curved twice in opposite directions.

4. The combination of claim 1, in which the web of the girder is buckled.

5. The combination of claim 1, in which the web of the girder is buckled in two places.

6. The combination of claim 1, in which reinforcing means are connected to the web of the girder.

HERBERT SCHELLER.
KARL WAGNER.
KARL AIKELE.